Figure 1:
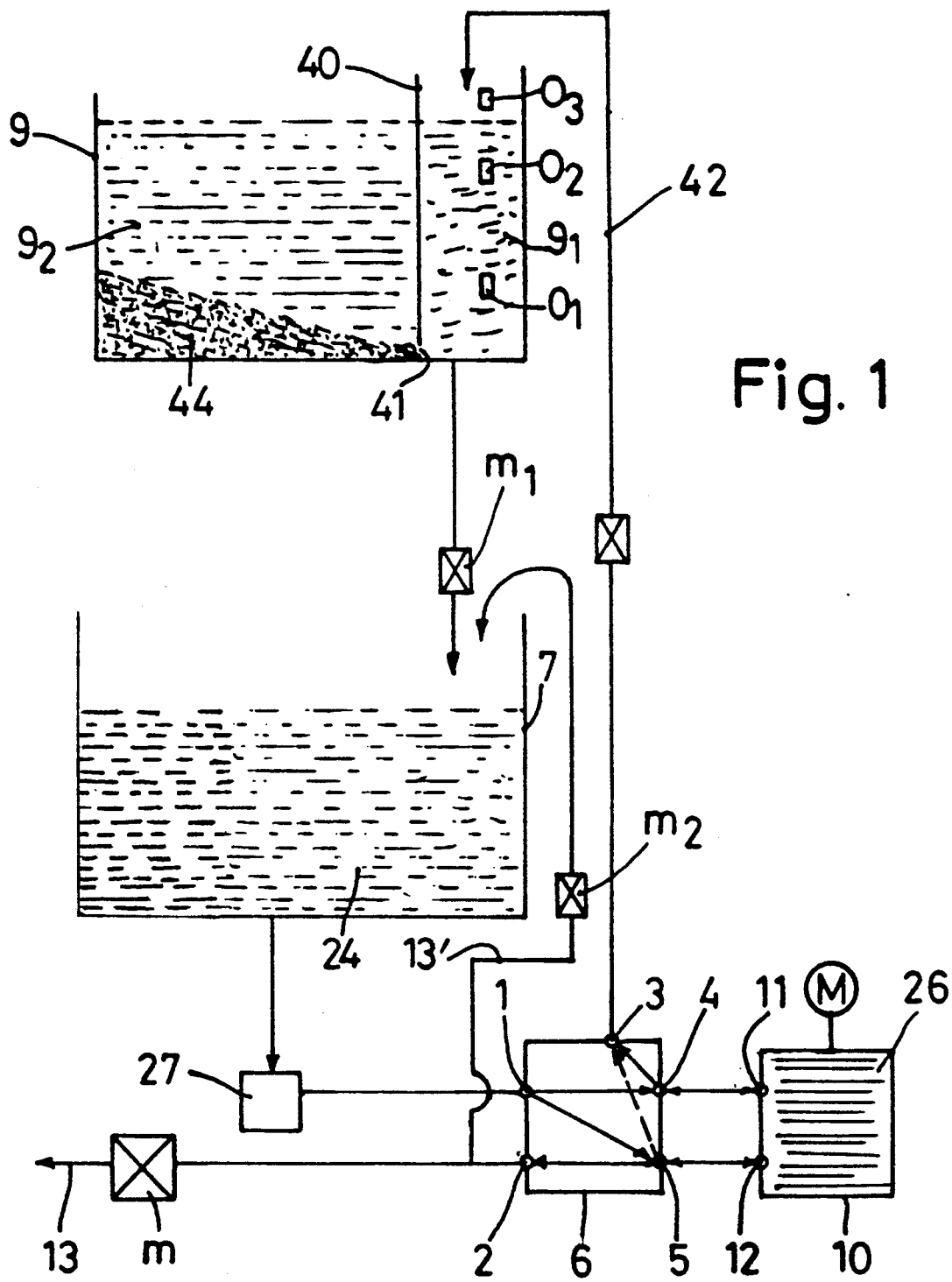

United States Patent [19]

Martinez-Mugica

[11] Patent Number: 5,118,411
[45] Date of Patent: Jun. 2, 1992

[54] FILTRATION SYSTEM FOR LIQUIDS WITH SUSPENDED PARTICLES

[76] Inventor: Fernando Martinez-Mugica, Larrasoloeta, 5, 48200 Durango, Spain

[21] Appl. No.: 656,775

[22] Filed: Feb. 15, 1991

[51] Int. Cl.⁵ .................... B01D 21/24; B01D 21/34; B01D 24/46; B01D 24/48
[52] U.S. Cl. .................... 210/104; 210/106; 210/111; 210/143; 210/195.1; 210/305; 210/320; 210/521
[58] Field of Search ............... 210/104, 106, 111, 320, 210/305, 257.1, 741, 744, 521, 143, 134, 195.1

[56] References Cited

U.S. PATENT DOCUMENTS

| | | | |
|---|---|---|---|
| 4,317,732 | 3/1982 | Shoquist | 210/744 |
| 4,859,325 | 8/1989 | Cormier | 210/521 |
| 5,013,432 | 5/1991 | Martinez-Mugica | 210/195.1 |

FOREIGN PATENT DOCUMENTS

| | | |
|---|---|---|
| 8900619 | 2/1989 | Spain . |
| 914393 | 1/1963 | United Kingdom . |
| 1392084 | 4/1975 | United Kingdom . |
| 2172216 | 9/1986 | United Kingdom . |

*Primary Examiner*—Robert A. Dawson
*Assistant Examiner*—Sun Uk Kim

[57] ABSTRACT

A system for the filtering of liquids with suspended particles in which the settling tank is divided into a first and a second tank ($9_1$), ($9_2$) with communication (41) between them at a low level, the washing/rinsing pipe (42) delivering to the first tank ($9_1$) which in turn communicates with the dirty liquid tank (7), with a fork (13') in the clean liquid pipe (13) being provided at the outlet from the valve assembly (6) and leading to the dirty liquid tank (7).

10 Claims, 1 Drawing Sheet

FILTRATION SYSTEM FOR LIQUIDS WITH SUSPENDED PARTICLES

With the filtration system disclosed in Spanish patent 8900619 it has been found in practice that some of its components can be improved as the following problems have been encountered:

the liquid included in the settler tank (9) derives from various liquids which arrived at different times with different degrees of dirtiness or contamination, with the result that time and energy is lost in mixing them.

whenever the system is set in operation after each stoppage a water hammer effect is produced in the filter (10) which stirs up dirt which is not desired in the clean liquid pipe (13).

These problems have been overcome by the applicant in the manner described below.

FIG. 1 is a diagrammatical view of the improvements made in the system for the manufacture of liquids with suspended particles.

A non-restrictive embodiment of this invention is described below. This does not in any way rule out other embodiments introducing additional changes which do not differ in their fundamentals; on the contrary, this invention also includes all its variants.

The system disclosed in Spanish patent 8900619 operates as follows:

Filtration stage: the dirty liquid (24) pumped by pump (27) follows the following path: primary path (1)→fourth path (4)→upper path (11) of the filter→lower path (12) of the filter→fifth path (5)→second path (2)→pipe (13).

Filter washing stage: the filter (10) ceases to perform its function with use and must be regenerated, and for this purpose valve assembly (6) is provided in such a way that liquid is circulated by pump (27) in the following way: first path (1)→fifth path (5)→lower path (12) of filter (10)→upper path (11) of filter (10)→fourth path (4)→third path→settling tank (9).

Filter rinsing stage: after the filtration stage the filter element (26) is neither in a correct position nor in a correct condition within the filter (10) and there are still particles which have resisted being washed off. In order to overcome this and to be able to begin the filtration stage again the filter is subjected to a rinsing stage in which the liquid circulates as follows: first path (1)→fourth path (4)→upper path (11) of the filter (10)→lower path (12) of the filter (10)→fifth path (5)→third path (3)→settling tank (9).

In the improvements it is provided that the settling tank (9) is divided into a first tank ($9_1$) and a second tank ($9_2$) by means of a wall (40).

Wall (40) may be movable in order to adjust the volumes of the first and second tanks ($9_1$), ($9_2$) to requirements and a series of holes (41) placed in the first and second tanks ($9_1$), ($9_2$) are provided in its lower part.

The dirty liquid from the washing and rinsing stages is returned to the first tank ($9_1$) by means of the washing-rinsing pipe (42).

The liquid from the washing stage is very dirty and the dirt in suspension tends to sediment out, and as a result of the thrust of the current between the first and the second tanks ($9_1$), ($9_2$) through the openings (41) the dirt mainly passes into the second tank ($9_2$).

The rinsing stage is then carried out, producing a cleaner liquid in the washing-rinsing pipe (42) which on entering the first tank ($9_1$) carries the small amount of dirt deposited in it into the second tank ($9_2$) in such a way that relatively clean liquid is left in the first tank ($9_1$) and dirty liquid and the dirt (44) which has sedimented out, and which can be removed in a conventional way, is left in the second tank ($9_2$).

This results in a tank (9) with relatively clean liquid which can be used in the washing and settling stages, and which can be placed in communication with the dirty liquid tank (7) (relatively dirty) by means of valve ($m_1$).

Level sensors are provided in the first tank ($9_1$), a lower sensor ($O_1$), an intermediate sensor ($O_2$) and an upper sensor ($O_3$) and the provision of similar level sensors in the other tanks falls within the scope of the invention.

When the installation is put into service and pump (27) is operated for the filtration stage a very considerable increase in pressure signalled by a pressure gauge (M) occurs in the filter (10) causing particles of dirt to be torn away and block pipe (13) which is intended to be only for filtered, i.e. clean liquid.

In order to overcome the problem a fork (13') is placed in filter liquid pipe (13) leading to a dirty liquid tank (7), ($9_1$), in FIG. 1 goes to the dirty liquid tank (7).

The system may be manual but it is better to provide it with conventional means of automation in such a way that it can function as follows:

Filtration stage: 1st stage.

The dirty liquid (24) is filtered as indicated in the principal patent. Valve (m) in pipe (13) is closed and valve ($m_2$) in fork (13') is opened delivering to the dirty tank (7). This first stage lasts 15 seconds for example.

2nd stage. Valve ($m_2$) is closed, valve (m) is opened and the system continues to function as described in the principal patent.

Washing and rinsing stages: Valve ($m_1$) is opened and the first tank ($9_1$) of the settling tank (9) is placed in communication with the dirty liquid tank (7) until the liquid in the first tank ($9_1$) reaches the lower level sensor ($O_1$). Valve ($m_1$) is closed and the system begins to operate as described for this washing stage in the principal patent, until the level in the first tank ($O_1$) rises to reach the intermediate sensor ($O_2$) whereupon the rinsing stage begins and lasts until the level in the first tank ($O_1$) reaches the level of the upper sensor ($O_3$), whereupon the cycle begins again.

Provision may be made for communication (41) between the first and second tanks ($9_1$), ($9_2$) to be regulated.

I claim:

1. In a system for the filtration of liquids having suspended particles comprising a tank for liquid to be filtered free of particles, a filter, a valve assembly for regulating liquid flow comprising a valve unit and at least one valve, and a settling tank; the valve assembly constructed and arranged to fluidly connect the tank for liquid to be filtered, and the settling tank with each other and with the filter; the tank for liquid to be filtered, the filter, the valve assembly and the settling tank all having means for fluid communication therebetween; and the tank for liquid to be filtered, the filter, the valve assembly, and the settling tank all being connected together by the means for fluid communication therebetween, wherein the improvement comprises:

the settling tank being divided into first and second tanks with communication therebetween, the first tank also having means for communication with the valve unit and with the tank for liquid to be filtered free of particles.

2. The system of claim 1 wherein the first and second tanks of the settling tank are separated by a separation member and the communication between the first and second tanks comprises a series of holes in the lower part of the separation member.

3. The system of claim 1 further comprising the valve unit having a pipe for transport of filtered liquid, the pipe having a fork therein which leads to the tank for liquid to be filtered free of particles.

4. The system of claim 1 wherein the settling tank has a series of level sensors and the filter has a pressure gauge capable of producing a signal, the level sensors and the signal from the pressure gauge acting to provide input signals to an automation assembly which acts by controlling the valve assembly to regulate the flow of liquid.

5. In a system for the filtration of liquids having suspended particles having a tank for liquid to be filtered free of particles, a settling tank, a filter, a valve assembly comprising a valve unit and at least one valve; the valve unit constructed and arranged to fluidly connect the tank for liquid to be filtered and the settling tank with each other and with the filter; the tank for liquid to be filtered, the filter, the valve assembly and the settling tank all having means for fluid communication therebetween; and the tank for liquid to be filtered, the filter, the valve assembly, and the settling tank all being connected together by the means for fluid communication therebetween; the filtering system having a filtering phase, a filter-washing phase and a rinsing phase, the valve unit having means to differently connect the tanks in the respective phases, wherein the improvement comprises:

the settling tank being divided into first and second tanks with communication therebetween, the first tank also having means for communication with the valve unit and with the tank for liquid to be filtered free of particles.

6. The system of claim 5 wherein the first and second tanks of the settling tank are separated by a separation member and the communication between the first and second tanks comprises a series of holes in the lower part of the separation member.

7. The system of claim 5 further comprising the valve unit having a pipe for transport of filtered liquid, the pipe having a fork therein which leads to the tank for liquid to be filtered free of particles.

8. The system of claim 5 wherein the settling tank has a series of level sensors and the filter has a pressure gauge capable of producing a signal, the level sensors and the signal from the pressure gauge acting to provide input signals to an automation assembly which acts by controlling the valve assembly to regulate the flow of liquid.

9. In a settling tank for use in a system for the filtration of liquids with suspended particles, the system comprising a tank for liquid to be filtered free of particles, a filter, a valve assembly for regulating liquid flow, and the settling tank; the valve assembly constructed and arranged to fluidly connect the tank for liquid to be filtered and the settling tank with each other and with the filter; the tank for liquid to be filtered, the filter, the valve assembly and the settling tank all having means for fluid communication therebetween; and the tank for liquid to be filtered, the filter, the valve assembly, and the settling tank all being connected together by the means for fluid communication therebetween, wherein the improvement comprises:

the settling tank being divided into first and second tanks with communication therebetween, the first tank also having means for communication with the valve unit and with the tank for liquid to be filtered free of particles.

10. The settling tank of claim 9 wherein the first and second tanks are separated by a separation member, the communication between the first and second tanks comprises a series of holes in the lower part of the separation member and wherein the settling tank has a series of level sensors which sense the level of liquid in the tank.

* * * * *